US006253219B1

(12) United States Patent
Gardner et al.

(10) Patent No.: US 6,253,219 B1
(45) Date of Patent: Jun. 26, 2001

(54) METHOD FOR UTILIZING THE POSTAL SERVICE ADDRESS AS AN OBJECT IN AN OBJECT ORIENTED ENVIRONMENT

(75) Inventors: David P. Gardner, New Milford; Jeffrey D. Pierce, Norwalk, both of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 08/997,708

(22) Filed: Dec. 23, 1997

(51) Int. Cl.[7] .......................................................... G06F 9/445

(52) U.S. Cl. .......................... 707/530; 707/103; 705/401; 705/408; 717/2; 717/3

(58) Field of Search .................................... 707/103, 530, 707/531; 705/408, 411, 401; 717/2–3

(56) References Cited

U.S. PATENT DOCUMENTS

| | | | | |
|---|---|---|---|---|
| 4,858,907 | | 8/1989 | Eisner | 271/124 |
| 5,121,484 | | 6/1992 | Hirami et al. | 707/531 |
| 5,175,691 | | 12/1992 | Baker et al. | 700/220 |
| 5,278,947 | | 1/1994 | Balga et al. | 358/1.18 |
| 5,319,562 | * | 6/1994 | Whitehouse | 705/403 |
| 5,326,181 | | 7/1994 | Eisner et al. | 400/104 |
| 5,379,426 | | 1/1995 | Foss et al. | 709/315 |
| 5,423,043 | | 6/1995 | Fitzpatrick et al. | 709/303 |
| 5,463,770 | | 10/1995 | Todd | 707/206 |
| 5,499,369 | | 3/1996 | Atkinson | 709/300 |
| 5,546,577 | | 8/1996 | Marlin et al. | 707/103 |
| 5,583,970 | | 12/1996 | Strobel | 358/1.15 |
| 5,606,609 | | 2/1997 | Houser et al. | 713/179 |
| 5,717,597 | * | 2/1998 | Kara | 705/408 |
| 5,778,076 | * | 7/1998 | Kara et al. | 380/51 |
| 5,796,834 | * | 8/1998 | Whitney et al. | 380/25 |
| 5,801,364 | * | 9/1998 | Kara et al. | 235/375 |
| 5,801,944 | * | 9/1998 | Kara | 705/401 |
| 5,812,991 | * | 9/1998 | Kara | 705/410 |
| 5,878,411 | * | 3/1999 | Burroughs et al. | 707/4 |
| 5,905,987 | * | 5/1999 | Shutt et al. | 707/103 |
| 5,956,730 | * | 9/1999 | Burroughs et al. | 707/104 |
| 5,978,781 | * | 11/1999 | Sansone | 705/408 |
| 5,987,441 | * | 11/1999 | Lee et al. | 705/401 |
| 6,006,237 | * | 12/1999 | Frisbey | 707/104 |
| 6,026,385 | * | 2/2000 | Harvey et al. | 70/408 |
| 6,032,138 | * | 2/2000 | McFiggans et al. | 705/410 |
| 6,035,291 | * | 3/2000 | Thiel | 705/408 |
| 6,182,274 | * | 1/2001 | Lau | 717/1 |

FOREIGN PATENT DOCUMENTS 0 735 722 A2 2/1996 (EP) .

OTHER PUBLICATIONS

Smalltalk/V PM Officevision/2 Release 2 Mail Service, Nov. 1, 1991, IBM Technical Disclosure Bulletin, vol. No. 34, Issue No. 6, pp. No. 428–430.*

"The Java Tutorial," for the Internet, Sun Microsystems, Inc., 1995.

"Object–Oriented Modeling and Design," Prentice Hall, New Jersey.

* cited by examiner

*Primary Examiner*—Stephen S. Hong
*Assistant Examiner*—Cesar B. Paula
(74) *Attorney, Agent, or Firm*—Charles R. Malandra, Jr.; Michael E. Melton

(57) ABSTRACT

The invention is a method and system for creating an address object, in an object oriented development environment of a data processing system. The address object is utilized during the creation of a document within a data processing system. The method includes both the object creation environment and the method of object utilization. The method establishes an object creation function within the data processing system, and then instantiates the address object by registering an object class within the object creation function, and then naming the class. Instantiation of the object establishes a programming interface to the address object. The properties of the address object are established by placing a set of object methods such as storage instructions, display instructions, and, printing instructions, together with: postal coding functionality; address manipulation functionality; a set of addressing data tables; and, a human interface within the address object by utilizing the established programming interface. The system user invokes the address object which causes the system to perform postal coding and address manipulation on the address field under control of the address object. The system establishes and utilizes the address object by employing data processing means for manipulating data; memory means for storing a plurality of data tables for use by the data processing means; input means for inputting data to the system; and, output means for outputting data from the system.

18 Claims, 6 Drawing Sheets

PRIOR ART METHOD

METHOD FOR UTILIZING THE POSTAL SERVICE ADDRESS AS AN OBJECT IN AN OBJECT ORIENTED ENVIRONMENT

RELATED APPLICATION

Reference is made to application Ser. No. 08/997,696, entitled OLE AUTOMATION SERVER FOR MANIPULATION OF MAIL PIECE DATA, assigned to the assignee of this application and filed on even date herewith.

BACKGROUND OF THE INVENTION

As the capabilities of data processing systems has grown, so too have the requirements that are tasked to these systems. Greater speed in these systems has given rise to more detail-oriented applications, greater memory capability has made memory intensive applications more attractive, and detailed applications have lead to more wide-spread use of previously inaccessible data processing abilities. With the spiraling growth in data processing ability, there has grown a need for more efficient ways of programming that promote speed as well as flexibility. Flexibility, in particular, allows applications that have been designed in varied programming languages, or operating on different platforms to be able to communicate without extensive system or file modification.

One such means of promoting flexibility within a data processing system is the use of "object-oriented" design (OOD). Object oriented programming languages are useful in removing some of the restrictions that have hampered application design due to the inflexibility of traditional programming languages.

OOD utilizes a basic element or construct known as the "object," which combines both a data structure and an intended behavior characteristic within the single element. Objects are bundles of data and the procedures which best identify the use of that data. Objects can be specific or conceptual and are often used to represent models of real-world object groupings; this has the effect of helping software applications become an organized collection of discrete objects in which data is held or moved based on the intended behavior of an object which is inherently unique. Each object knows how to perform some activity.

The objects interact and communicate with each other via messages. A message is initiated by one object for the purpose of getting a second message to perform an act such as performing the steps of a method. Information parameters may be passed along with the message so that the receiving object will have guidelines for performing its action.

Software objects share two characteristics; they all have "state" and "behavior." State is the condition of the object expressed in variables (what it knows), while behavior is implemented by performance of a method (what it can do). Packaging the object's variables, together with its methods, is referred to as "encapsulation." Encapsulation is used to hide unimportant implementation details from other objects; and, this in turn provides two primary benefits to software developers. These benefits are: (1) modularity and (2) information hiding.

Modularity of objects means that the source code for an object can be written and maintained independently of the source code for other objects, thus allowing a certain autonomy of purpose for each individual object. Information hiding, on the other hand, is the ability to keep private certain of its data and methods without effecting the other objects which may depend upon it. Common dependencies among objects can maintain communication by utilizing a public interface for information sharing.

Objects interact and communicate with each other though the use of messages. Each message has three components that are necessary for a receiving object to be able to perform a desired method; these are: (1) the object to whom the message is addressed; (2) the name of the method that is to be performed; and (3) the method required parameters. Because these three components alone represent what is required for methods to be activated, it is not required that objects be located within the same process in order for communication to take place. Message use, therefore, is the supporting means for object interaction. But to be of value to a particular application, objects must be able to be referenced.

Referencing is accomplished through indexing, addressing, or through value assignment which can be placed in a table for use as required. Objects can also be arranged by classification. Classification is based on groupings of objects based upon properties or characteristics important to an application or requirement. Each class describes a potentially infinite set of objects that comprise that class. Object interaction can be further optimized by the use of class distinction. Classes are organizational blueprints that define the variables and methods which are common to all objects of a particular group. Values for each of the variables are assigned and allocated to memory when an instance from a class is created. Additionally, methods can only be performed when a class instance has been allocated to memory. Thus, the most distinct advantage of class use is the ability to reuse the classes and thus further create more objects. Classes, in turn, can be subdivided into subclasses which inherit the state of the underlying class. The further advantage being the ability to create specialized implementations of methods.

The constant growth and expansion of software systems and the hardware platforms that support them has led to the emergence of object oriented programming which reduces time and memory capacity requirements by taking advantage of certain redundancies by treating them as unique software objects.

The advantages of objects lie in the ability of objects to link performance characteristics. This greatly optimizes the using system's ability to find data and use it effectively. Systems that utilize formats whose structure and requirements repeat, would benefit greatly from object oriented techniques. And, if the system were to be able to define its principle data requirements in the form of objects, it would inherit the advantages of the object oriented environment while maintaining the inherent system advantages.

OOD is known in the software arts and specific discussion of application design based upon OOD is not required for a thorough understanding of the applicant's claimed invention. It is, however, one object of the present claimed invention to disclose a method and system for utilizing object oriented design to effectively and efficiently link applications within an addressing system.

Addressing systems are an example of systems whose purpose is to maintain address lists, perform addressing hygiene through the use of address correction techniques, and, prepare the data for downloading to addressing printers. Addressing systems are known in the art and have developed with changes in postal service regulations (such as the United States Postal Service, or USPS) and the need to automate and accelerate to accommodate growth.

As the USPS, together with the postal services of other countries around the world, moves toward more fully automated mail handling in an effort to contain costs while processing ever increasing volumes of mail, automated equipment which sorts and processes mail on the basis of machine readable postal codes, such as the "zip code" or other forms of postal coding, play an ever more significant role. In the United States, postal service regulations provide for a "Postnet" bar code which represents the five or nine digit zip code of the destination address in a machine readable form.

Systems have been used or proposed to meet the need to produce mail pieces imprinted with the Postnet bar code, and to enable mailers to obtain the benefit of the discounts offered for such mail. One such system is described in U.S. Pat. No. 4,858,907, for a SYSTEM FOR FEEDING ENVELOPES FOR SIMULTANEOUS PRINTING OF ADDRESSES AND BAR CODES, issued to Eisner et al. (hereinafter referred to as Eisner-1) on Aug. 22, 1989. This patent discloses a system for printing envelopes with addresses, zip codes, and corresponding bar codes. The system is controlled by a computer which includes software for converting a zip code included in the address into bar code form and then adding the bar code representation to the material to be printed on the envelope.

Another example of the art is found in U.S. Pat. No. 5,326,181 for an ENVELOPE ADDRESSING SYSTEM ADAPTED TO SIMULTANEOUSLY PRINT ADDRESSES AND BAR CODES; issued on Jul. 5, 1994 to Eisner et al. (hereinafter referred to as Eisner-2). This patent teaches a method of addressing substrates with a human readable address containing a zip code and a bar code corresponding to the zip code. The method utilizes a computer and comprises several steps. These steps include: receiving in the computer a plurality of addresses, with pre-existing zip code information contained in each as complete address data, and requiring no manual inputting or identification; automatically scanning the address data in the computer to find the pre-existing zip code; automatically converting, in the computer, the pre-existing zip code into a line of corresponding bar code; and, essentially simultaneously printing the complete address, including zip code information and corresponding bar code, on a substrate, under control of the computer so that the substrate produced has human readable zip code and machine readable bar code information thereon.

Additionally, a system for printing envelopes with addresses including bar code is disclosed in commonly assigned U.S. Pat. No. 5,175,691 for a SYSTEM AND METHOD FOR CONTROLLING AN APPARATUS TO PRODUCE ITEMS IN SELECTED CONFIGURATIONS; issued on Dec. 29, 1992 to Baker et al. (hereinafter referred to as Baker), which describes a system for printing mail pieces which includes a printer for printing sheets and envelope forms and a folder-sealer mechanism for folding the envelope form around the sheets to form a mail piece, and a computer based control system for controlling the printer and folder. In the system of this application, when an operator is creating a file of letters to be printed, the operator may designate a selected field within each letter as containing the destination address. The system will then extract the information in this designated field and with it create a new page of material to be printed on the envelope form; and, if the address within the designated field includes a zip code, the system will add a corresponding barcode to the new page. The system then adds this new page to the file before the file is output.

U.S. Pat. No. 5,278,947 for a SYSTEM FOR AUTOMATIC PRINTING OF MAIL PIECES; issued Jan. 11, 1994 to Balga, Jr. et al. (hereinafter referred to as Balga), and assigned to the assignee of the present claimed invention, is for a system which includes a printer for printing text in response to the input of signals. The printer has a capability to selectively print either sheets or envelopes. The system further includes a controller for output of a sequence of signals representative of materials to be printed on a sheet which forms part of the mail piece, where the sequence includes a subset of signals representative of an address.

In accordance with another aspect of the Balga invention, the system includes a scanning mechanism for identifying a character string which conforms to a valid postal coding standard. The system further includes a mechanism for identifying the character string as a valid postal code. Additionally, the system forms the destination address to include a line including the postal code and a selected number of proceeding lines of text.

The ability to structure software coding is extremely important when linking data to be downloaded to a printer being utilized in the addressing environment. U.S. Pat. No. 5,583,970 for a PRINTER COMMAND SET FOR CONTROLLING ADDRESS AND POSTAL CODE PRINTING FUNCTIONS, issued Dec. 10, 1996 to Strobel (hereinafter referred to as Strobel), and assigned to the assignee of the present claimed invention, is instructive in this respect.

Strobel is a method and system for printing images to a substrate wherein the commands normally input by an operator, or resident within the printer, can be determined at a host data processor. The system can control address and postal code printing functions beginning at the host computer together. The system will derive printing data, including address data, from a selected application resident in the host computer. The host computer creates and then transmits printer command sets and printing data, via transmitting means to a microprocessor within the printer. The microprocessor drives a language interpreter which directs the printer commands to a parsing step for determining the address location from within the data to be printed. The language interpreter then assigns delivery point digits to a zip code that was isolated from the transmitted address data. The newly created zip code is then matched with the bar code data stored within the microprocessor's corresponding memory. A bar code corresponding to the new zip code is selected. The language interpreter then directs the printer's controller to prepare to print the address with its corresponding zip code, any graphics images that may have been included within the print data, and text, if any. The printer controller positions the bar code for printing, and then prints the bar code and address data, zip code, and any graphics images and text to an envelope or other substrate.

Thus, Strobel overcame the limitations of the prior art by providing flexibility in determining what data, and how much, may be downloaded for printing to a substrate. Flexibility is accomplished by controlling address and postal coding functions in the printer from a host computer. The invention thus simplifies the firmware required in a selected printer, or can allow the performance of additional tasks or provide for greater database functionality under the direction of the printer microprocessor. Thus, printer ROM memory can be reduced or freed up for other tasks, and RAM memory can be increased to handle more detailed data.

The addressing art can clearly benefit from a method that captures the data field of the USPS address (or of any similar postal service defined address) and employs that method within a system that links it with the benefits of methods such as Strobel. Therefore, it is an object of the present invention to provide for a means of determining postal service data requirements; creating objects derived therefrom; and, then utilizing those objects to optimize addressing systems.

SUMMARY OF THE INVENTION

The limitations of the prior art are overcome by a method and system for creating an address object, in an object oriented development environment of a data processing system.

The method includes both the object creation environment and the method of object utilization. The method begins with the steps of establishing an object creation function within the data processing system, and then registering an object class within the object creation function, and then naming the class. The registration of the object establishes a programming interface to the address object. The instantiation of the object allows the PI to be used or invoked.

The properties of the address object are established by placing a set of object methods within the address object data utilizing the established programming interface. In addition to the object methods, postal coding functionality and address manipulation functionality are entered into the object through the programming interface, as well as a set of addressing data tables and a human interface. The set of addressing data tables further comprises: a plurality of address field data; rules for use of the address field data; error messages; and, suggestions for alternate paths of movement within the data processing system. The purpose of the human interface within the object is to allow data to be displayed to a system operator under direction from the object methods.

The set of object methods, entered into the object, comprise action instructions. The action instructions further comprise storage instruction for instructing the data processing system to store data; display instructions for instructing the data processing system to display data on the display; and, printing instructions for instructing the data processing means to print data on a printer.

The postal coding functionality comprises: an address verifier which contains a set of rules for applying coding requirements; a first set of coding tables for storing barcode data; and, a second set of coding tables for storing postal codes. In addition, the postal coding functionality comprises lookup means for looking up a postal code within a first set of coding tables. The lookup is based upon a comparison of a portion of an address field, entered into a data field, with a corresponding address field listed within the first set of coding tables.

The system's address manipulation functionality further comprises: address reconstruction functionality for the creation of a visual template for the restructuring of an address field within a data field; and, one or more sets of instructions for parsing the address field into sub-fields.

The address object, once created, is utilized during the creation of a document within a data processing system. The system user, or operator, determines that the entry of an address field is required within the document. The address is then entered, through input means, into an address field of the document; this action invokes the address object. Invocation of the address object causes the system to perform postal coding and address manipulation on the address field under control of the address object.

The system of the present invention establishes and utilizes the address object by causing a number of elements to act in a supportive relationship. The relationship is served by: data processing means for manipulating data; memory means for storing a plurality of data tables for use by the data processing means; input means for inputting a first group of one or more sets of data to the data processing system; and, output means for outputting a second group of one or more sets of data from the data processing system.

The system's input means can be either a keyboard or a scanner for scanning and reading barcode or address data. It is certainly contemplated by the current invention that a keyboard and a scanner could be employed together within the same system, as well as together with any commonly employed means of data entry such as download from another system or communication device, or other means known to the art. The output means for the presently disclosed system could be a printer, or a download to another system or communication device.

DETAILED DESCRIPTION OF THE PREFERRED EMBODIMENTS

Figure 1:
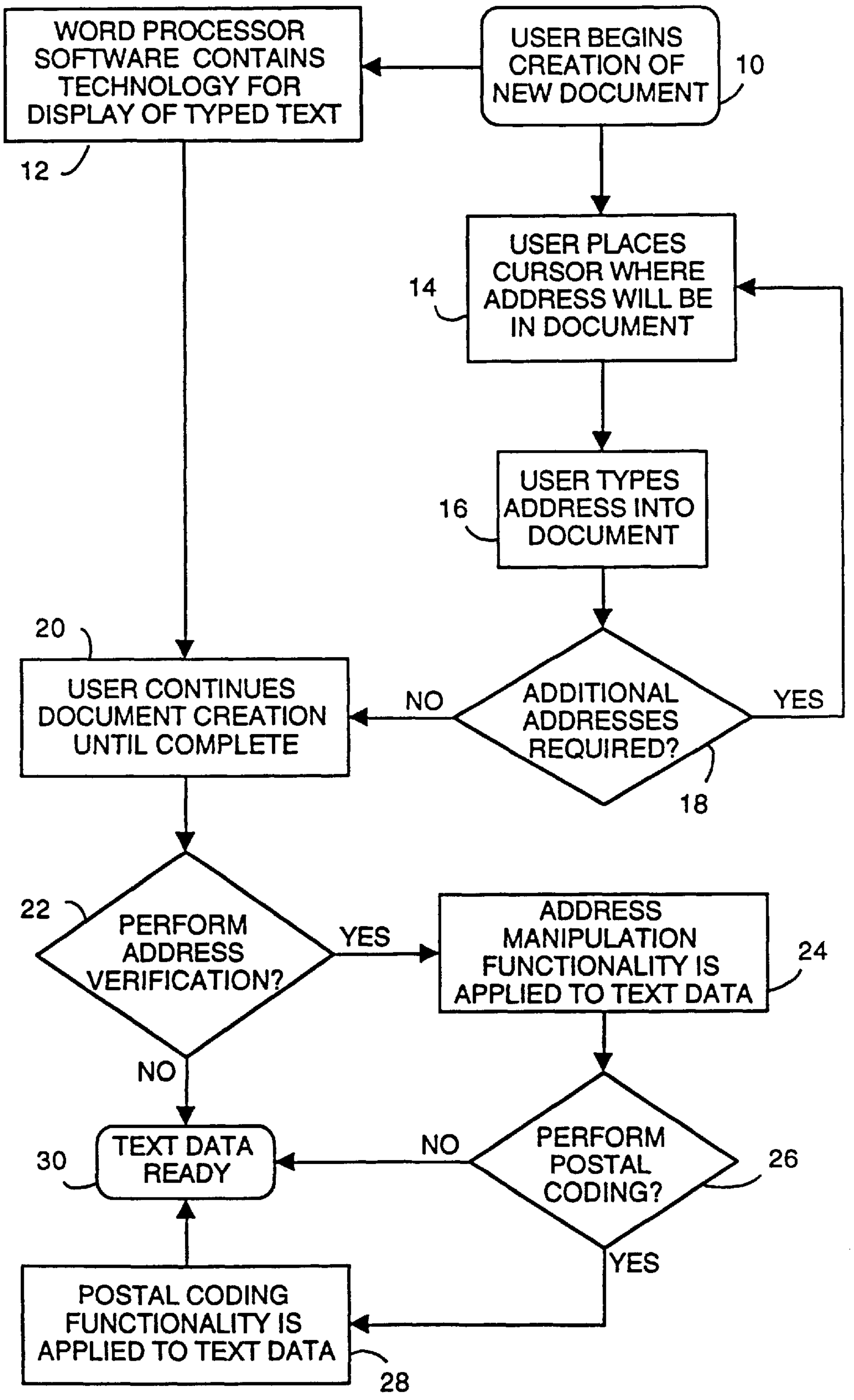
FIG. 1 is an upper level flowchart of the prior method of applying address manipulation and postal coding functionality to an address field.

The prior art method of invoking postal coding and address manipulation functionality for use with a document is shown in FIG. 1.

In FIG. 1, the method begins at step 10 when a system user begins to create a new document within a word processing, or similar, application of a data processing system. As the document text is being created, and essentially simultaneously with step 10, step 12 displays the text to the system user through the use of display technology embedded within the word processor application. The ability to display text, generally, is known in the art and does not require a detailed explanation herein for an understanding of the prior art method.

During the continued creation of the document, the system user, at step 14, would typically place the application's cursor where an address is to be added to the document. The method then advances to step 16 where the system user types the address into the appropriate space. The method generally allows the system user to add more addresses as required by querying, at step 18, as to whether or not additional addresses are required; the query can be either expressed or implied. If the response to the query is "YES," then the method would return to step 14 and allow the user to place the cursor for another address entry. If, however, the response to the query at step 18 is "NO," then the method advances to step 20 where the system user would continue with document creation until complete.

Once the document has been created, the system user can then elect, at step 22, to have address manipulation functionality applied to the document text. Typically, this functionality would include the ability to parse address field data and to reformat the address field data as required. If the system user, or the system itself through a default parameter, has elected to apply address manipulation functionality, then the method advances to step 24 and applies the functionality. From step 24, the method advances to an election at step 26 where the system user, or the system itself through a default parameter, can then elect to have postal coding functionality applied to the document text. Typically, this functionality would include the ability to parse address field data to determine a postal code; the postal code could then be used as determinative of an appropriate barcode. If the system user, or the system itself through a default parameter, has elected to apply postal coding functionality, then the method advances to step 28 and applies the functionality. From step 28, the method advances to step 30 where the text data is made ready for storage, use, or some other action.

Returning to steps 22 and 26, if the elections made at steps 22 or 26 were "NO," then the method advances to step 30.

Figure 2:
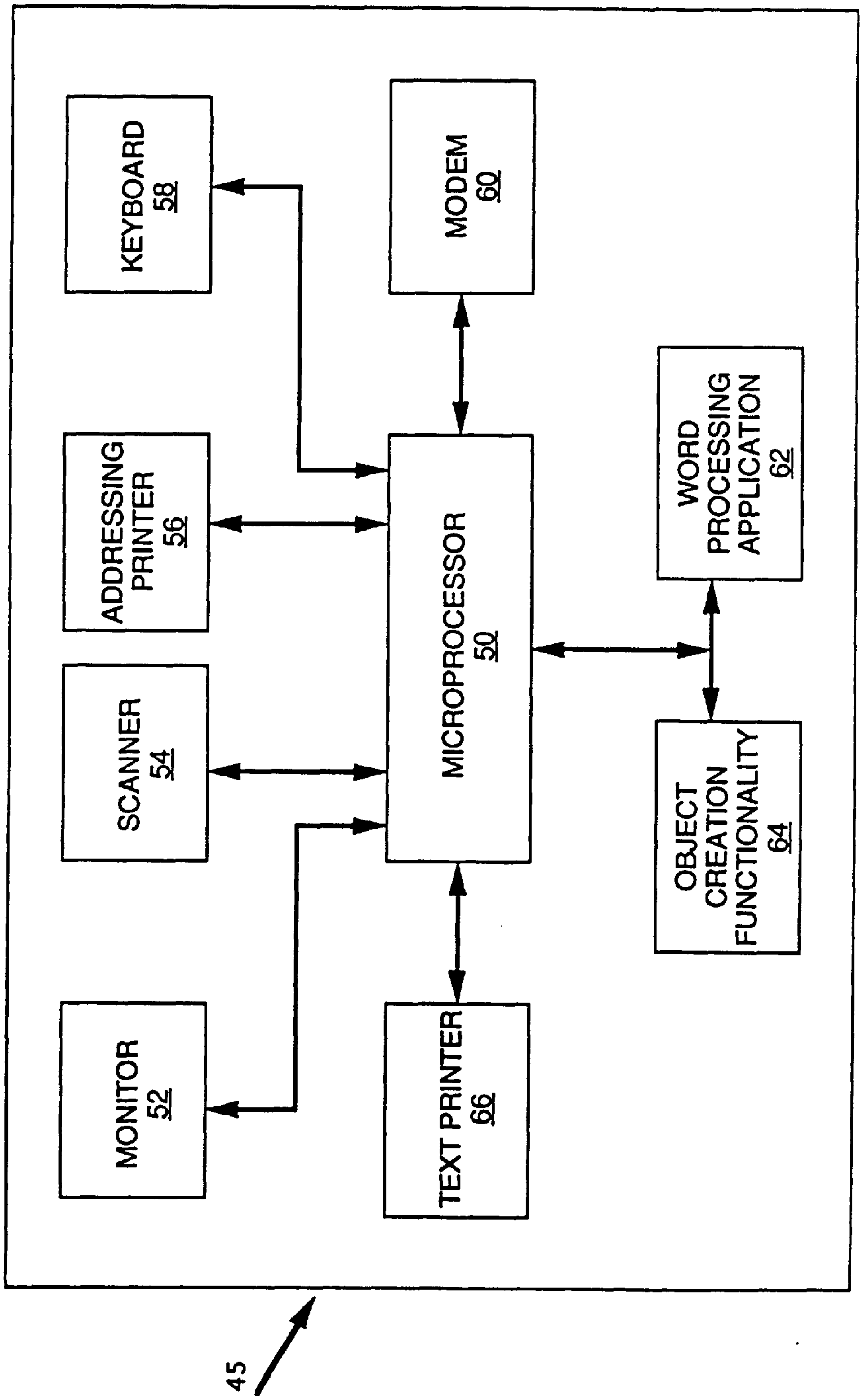
FIG. 2 is a block diagram of a typical system within which the method of the present invention could reside and be utilized.

Turning to FIG. 2, there is shown a block diagram of a typical system 45 within which the method of the present invention could reside and be utilized.

System 45 comprises a microprocessor 50 interoperatively connected to monitor 52 for viewing documents. The viewing of documents on monitor 52 promotes ease of use in word and data processing, and provides an example of the human interface that can be brought to system 45 by the methods proposed herein. Microprocessor 50 is interoperatively connected to scanner 54. Scanner 54 provides system 45 with the ability to scan address field data, barcodes, or other scannable data sources as an input to word processing application 62. Addressing printer 56 and text printer 66 are also interoperatively connected to microprocessor 50 and serve as the output devices by which address data or documents can be printed to a substrate. Additionally, keyboard 58 is interoperatively connected to microprocessor 50 and serves as an input device for the creation of documents or the input of data. Modem 60 gives system 45 the ability to communicate with other systems via communications means of varied types.

The implementation of certain data processing applications are what give addressing functionality to the peripheral devices employed within the context of system 45. Word processing application 62 and object creation functionality 64 communicate with each other and with microprocessor 50 for the purpose of causing the system to build object oriented documents within a word processing or similar context.

Figure 3A:
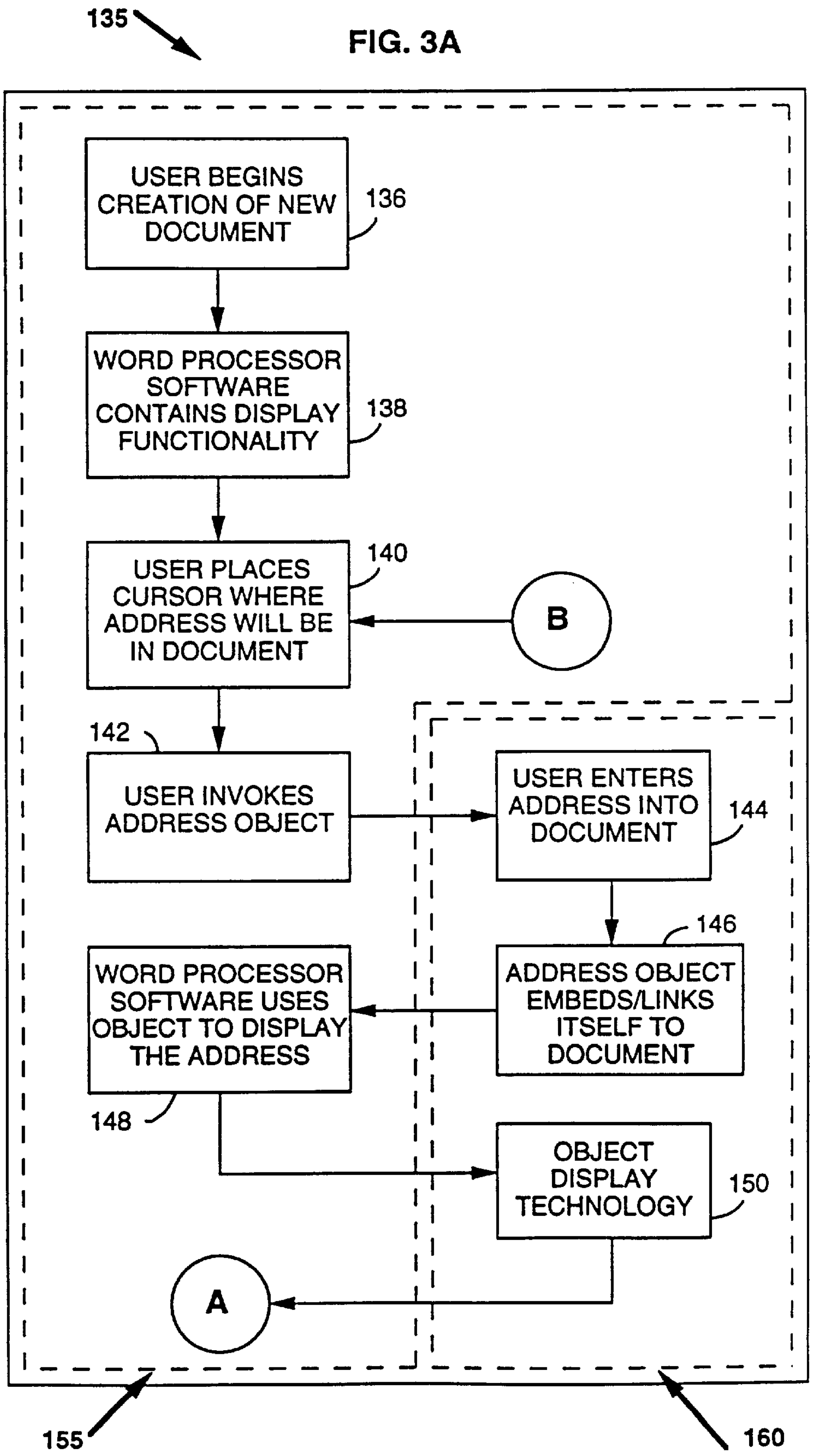
FIG. 3A is an upper level flowchart of the method of utilizing an address object to apply postal coding and address manipulation to an address field.
Figure 3B:
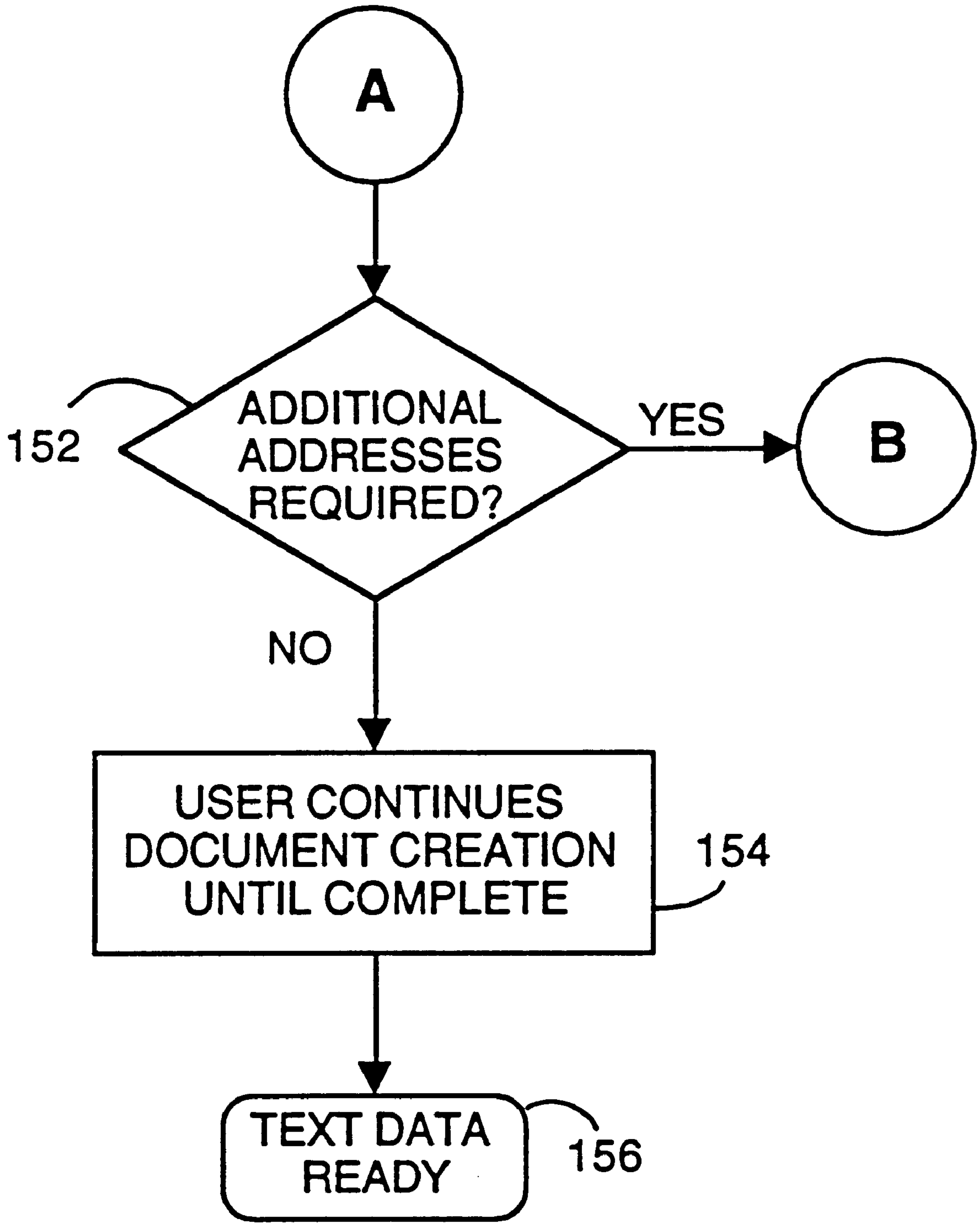
FIG. 3B is a continuation of flowchart 3A.

Turning to FIGS. 3A and 3B, there is shown an upper level flowchart of the method of utilizing an address object to apply postal coding and address manipulation to an address field.

In FIG. 3A, the overall method 135 is divided into categories of steps; those existing in the word processing environment 155 of application 62, and those existing in the address object environment 160.

Method 135 begins at step 136 when a system user begins to create a new document within a word processing, or similar, application of a data processing system 45. As the document text is being created, and essentially simultaneously with step 136, step 138 displays the text to the system user on a monitor 52 through the use of display technology embedded within the word processor application 62.

During the continued creation of the document, the system user, at step 140, would typically place the application's cursor where an address is to be added to the document. The method then advances to step 142 where the system user invokes the address object 300.

Invocation of the address object 300 can be determined through any one of several design possibilities that include the use of an entry command through the use of a keyboard 58 stroke, the entry of scanned data from a scanner 54, or the entry of downloaded data through a modem 60 or suitable communications link. The object is created by the system on an "as needed" basis, depending upon the predetermined design of the object.

The address is entered into the document at step 144 through the use of a keyboard entry, though it is contemplated that entry could be made by scanning the data or selecting it from another file available to the word processing application through storage or download. This step is now under control of the address object's properties and is thus associated with the address object environment 160. The method then advances to step 146 where the address object embeds or links itself to the document being created. The embedding/linking of the address object 300 now brings the address field within the document under the control of the object and thereby inheriting its characteristics.

From step 146, the method advances to step 148 where the word processing application 62 will use the address object 300 to display the address on the monitor 52 in conjunction with the application's own display technology. The address object 300 will control the display of the address field at step 150, essentially simultaneously with the application's control in step 48. From step 150, the method advances along path A to step 152 as is shown in FIG. 2B.

Turning to FIG. 3B, there is shown path A, coming from FIG. 3A, entering the system flow at step 152. Steps 152 through 156 are within word processing environment 155.

The method generally allows the system user to add more addresses as required by querying, at step 152, as to whether or not additional addresses are required; the query can be either expressed or implied. If the response to the query is "YES," then the method would return to step 140 in FIG. 3A, via path B, and allow the user to place the cursor for another address entry. If, however, the response to the query at step 152 is "NO," then the method advances to step 154 where the system user would continue with document creation until complete. From step 154, the method advances to step 156 where the text data is made ready for storage, use, or some other action.

Figure 4:
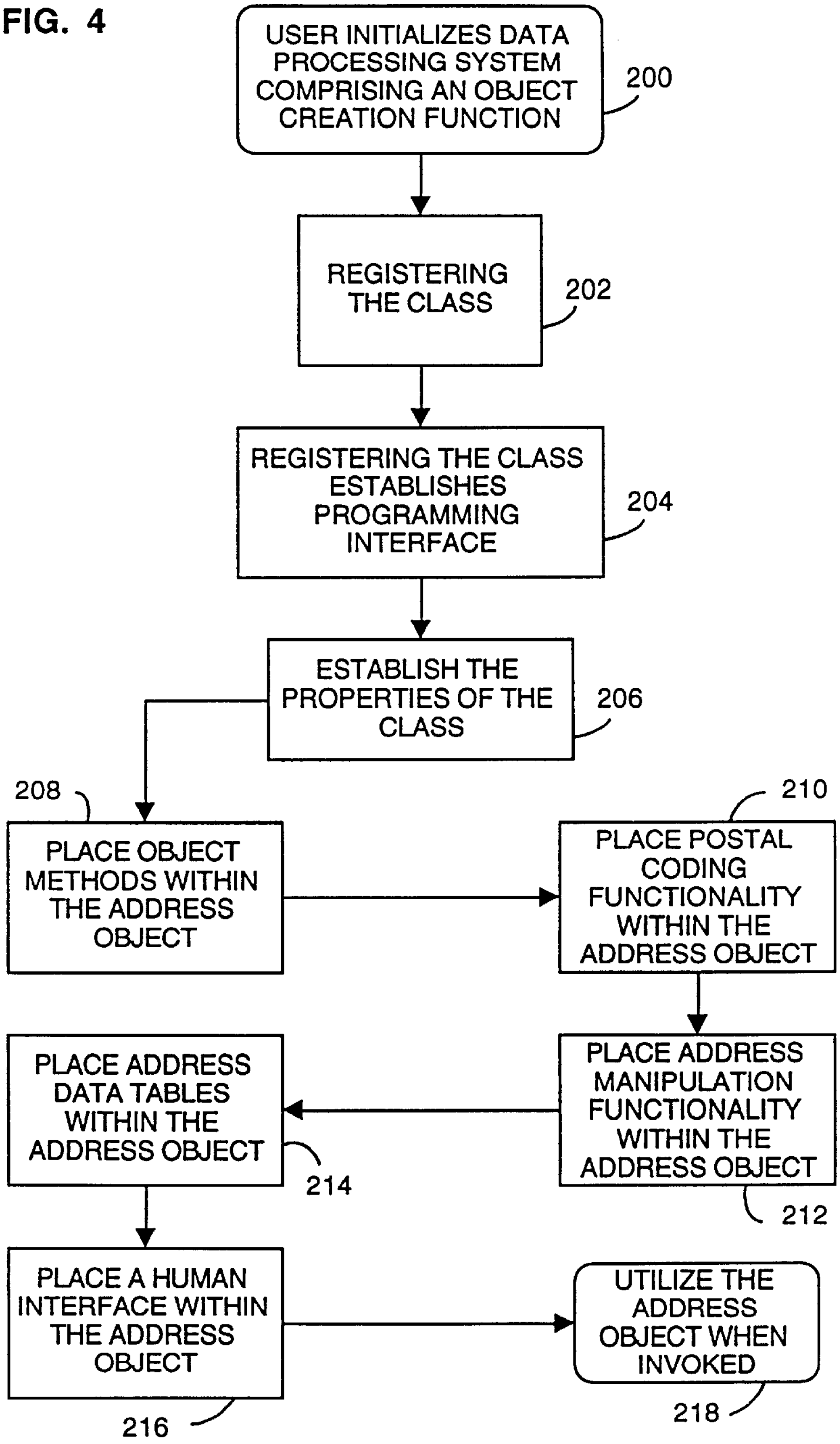
FIG. 4 is a flowchart of the method utilized to create the address object.

Turning to FIG. 4, there is shown a flowchart of the method utilized to create the address object 300. A detailed discussion of object oriented programming is not required for a full understanding of the method described hereunder.

The creation of the address object 300 begins at step 200 when a system user initializes a data processing system which has an object creation functionality resident therein. From step 200, the method advances to step 202 where the method instantiates registers an object class with the object creation functionality. Registration of the class creates, at step 204, a programming interface that will be used as a port of entry into the object. The port of entry will allow the system to place class properties within the object. The system user will determine the properties of the class at step 206. The specific properties of the address object are discussed in the description of FIG. 5.

From step 106, the method advances to step 208 where object methods are placed within the address object by entering them through the programming interface. The method then advances to step 210 where postal coding functionality is placed within the address object by entering it through the programming interface. In succession, address manipulation functionality, address data tables, and a human interface are placed within the address object by entering them through the programming interface in steps 212, 214, and 216 respectively. It should be noted that steps 208 through 216 can be performed in any order so long as each of the step actions are performed prior to utilization of the object.

When the properties of the address object 300 have been placed into the object, the method advances to step 218 where the address object can be used for its intended purpose when invoked. The use of the address object 300 reduces the steps necessary to apply postal coding and address manipulation functionality and is thus a significant improvement over the prior art. The properties of the address object will now be discussed in detail with reference to FIG. 5.

Figure 5:
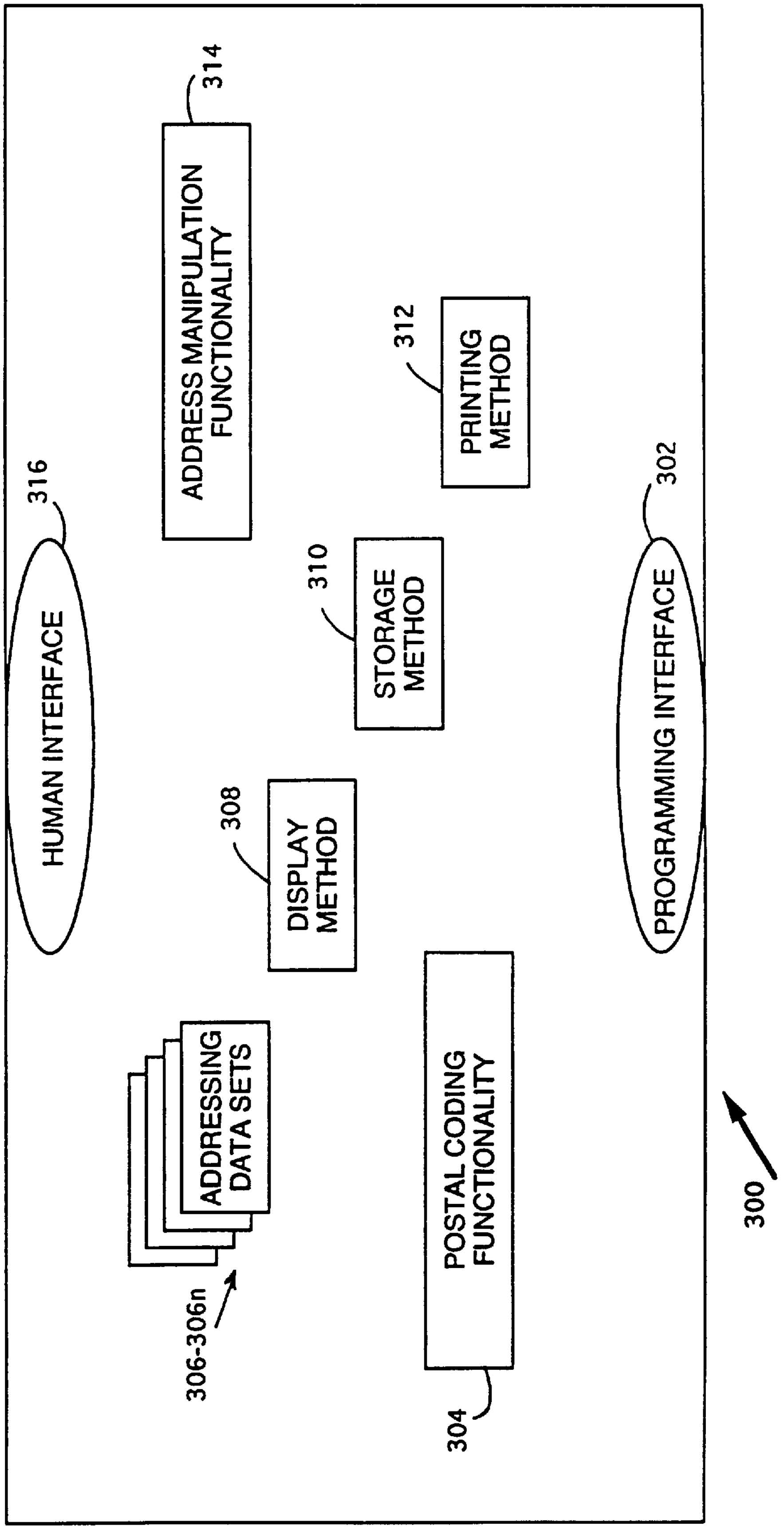
FIG. 5 is a block diagram of the address object and its constituent sub-elements.

Turning to FIG. 5, there is shown a block diagram of the address object 300 and its constituent sub-elements.

The address object 300 contains a programming interface 302 which serves as the portal by which properties of the address object 300 can be entered into it. The programming interface 302 is returned by the data processing system when the address object 300 is instantiated, thus allowing the address object 300 to be invoked as needed.

In applications such as Visual Basic, an object oriented designer would use a command such as "createobject" to instantiate the object. The "createobject" command returns a programming interface such as "interface.__" which will allow the designer to place the necessary properties into the object by entering their file name after the interface command.

The address object 300 has specific requirements; therefore, through the programming interface 302 will come: a human interface 316; postal coding functionality 304; address manipulation functionality 314; a set of addressing data tables 306–306*n*; and, a set of methods comprising display method 308, storage method 310, and printing method 312. Each of these elements is described in more detail hereinbelow.

Human interface 316 allows address object 300 to provide a visual interface to the system user; additionally, printing methods 312 as contained in address object 300 cause human interface 316 to direct a printer, such as addressing printer 56, to print data under the direction of the object. Thus, the purpose of human interface 316 is to provide the path for user interface functionality.

Additional functionality for address object 300 is provided by postal coding functionality 304 and address manipulation functionality 314. Each of these performs a unique role. Postal coding functionality 304 includes: an address verifier which comprises a set of rules for applying postal coding requirements; a set of coding tables for storing barcode data; and a second set of coding tables for storing postal codes. Postal coding functionality 304 further includes lookup instructions for looking up a postal code within a set of coding tables. The lookup is based upon a comparison of a portion of an address field, entered into a data field of a document, with a corresponding address field listed within the set of coding tables. Address manipulation functionality 314, on the other hand, provides for address reconstruction instructions and rules for the creation of a visual template for the restructuring of an address field within a data field; and sets of instructions for parsing the address field into sub-fields. Additionally, address manipulation functionality 314 allows address object 300 to separate person identification data from address data; this allows the creation of new addresses or general personal data lists to be constructed.

Addressing data tables 306–306*n* provide much of the address data utilized by the address object 300. Addressing data tables 306–306*n* include a number of fields from which an optimal data field will be constructed by address object 300; these further include: a choice of thirty different properties that an optimal address field can contain with respect to its data; rules for use of address field data; error messages; and suggestions for alternate paths of movement within data processing system 45.

Paths of movement are further dictated by address object 300 through the use of its distinct method elements. Display method 308 is used for instructing the data processing system to display data on monitor 52. Storage method 310 is used for maintaining instructions for the data processing system to store data in its associated memory or within a peripheral device. Printing method 312 is used for instructing the data processing system to print data on output means such as addressing printer 56, or a separate text printer 66.

While certain embodiments have been described above in terms of the system within which the address object methods may reside, the invention is not limited to such a context. The system shown in FIG. 2 is one example of a host system for the invention, and the system elements are intended merely to exemplify the type of peripherals and software components that can be used with the invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of creating an address object, in an object oriented development environment of a data processing system, comprising the steps of:

(a) establishing an object creation function within said data processing system;

(b) registering a class within said data object creation function and naming said class; and, wherein said instantiation establishes a programming interface to said address object;

(c) establishing the properties of said address object by:

(i) placing a set of object methods within said address object by utilizing said programming interface;

(ii) placing postal coding functionality within said address object by utilizing said programming interface;

(iii) placing address manipulation functionality within said address object by utilizing said programming interface;

(iv) placing a set of addressing data tables within said address object by utilizing said programming interface; and (d) creating a human interface, for allowing data to be displayed to a system operator under direction from said object methods, and placing said human interface within said address object by utilizing said programming interface.

2. The method of claim 1, wherein said set of addressing data tables further comprises:

(a) a plurality of address field data;

(b) rules for use of address field data;

(c) error messages; and (d) suggestions for alternate paths of movement within said data processing system.

3. The method of claim 1, wherein said set of object methods comprises action instructions; said action instructions further comprising display instructions for instructing said data processing system to display data on a display device.

4. The method of claim 1, wherein said set of object methods comprises action instructions; said action instructions further comprising storage instructions for instructing said data processing system to store data.

5. The method of claim 1, wherein said set of object methods comprises action instructions; said action instructions further comprising printing instructions for instructing said data processing system to print data on a data output device.

6. The method of claim 1, wherein said postal coding functionality further comprises:

(a) an address verifier further comprising a set of rules for applying coding requirements;

(b) a first set of coding tables for storing barcode data; and (c) a second set of coding tables for storing postal codes.

7. The method of claim 6, wherein said postal coding functionality comprises lookup means for looking up a postal code within first set of coding tables; said lookup based upon a comparison of a portion of an address field, entered into a data field, with a corresponding address field listed within said first set of coding tables.

8. The method of claim 1, wherein said address manipulation functionality further comprises:

(a) address reconstruction functionality for the creation of a visual template for the restructuring of an address field within a data field; and (b) one or more sets of instructions for parsing said address field into sub-fields.

9. A method of utilizing an address object, in an object oriented development environment of a data processing system having a word processing application, said method comprising the steps of:

(a) creating a document within said word processing application;

(b) determining that the entry of an address field is required within said document;

(c) entering, through input means, said address field into said document; and (d) invoking said address object, whereby said address object performs postal coding and address manipulation on said address field.

10. A system for establishing and utilizing an address object within a data processing system, said data processing system further comprising:

(a) data processing means for manipulating data;

(b) memory means for storing a plurality of data tables for use by said data processing means;

(c) input means for inputting a first group of one or more sets of data to said data processing system; and (d) output means for outputting a second group of one or more sets of data from said data processing system.

11. The method of claim 10, wherein said input means is a keyboard.

12. The method of claim 10, wherein said input means is a scanner.

13. The method of claim 10, wherein said output means further comprises a printer.

14. The method of claim 10, wherein said one or more sets of data further comprises a set of instructions for invoking said address object.

15. The method of claim 14, wherein said address object further comprises:

(a) a programming interface;

(b) a human interface;

(c) postal coding functionality;

(d) a set of address manipulation instructions;

(e) a set of addressing data tables; and (f) a set of methods comprising action instructions.

16. The method of claim 15, wherein said action instructions further comprise display instructions for instructing said data processing system to display data on said display means.

17. The method of claim 15, wherein said action instructions further comprise storage instructions for instructing said data processing system to store data.

18. The method of claim 15, wherein said action instructions further comprise printing instructions for instructing said data processing means to print data on said output means.

* * * * *

UNITED STATES PATENT AND TRADEMARK OFFICE
CERTIFICATE OF CORRECTION

PATENT NO. : 6,253,219 B1
DATED : June 26, 2001
INVENTOR(S) : Gardner et al.

It is certified that error appears in the above-identified patent and that said Letters Patent is hereby corrected as shown below:

Title page,
Item [54], insert -- PLACING POSTAL FUNCTIONALITY WITHIN -- after the word "FOR" and delete "UTILIZING THE POSTAL SERVICE ADDRESS AS."

Column 10,
Line 44, delete "instantiation" and replace with -- method of creating an address object --.

Column 12,
Line 2, before "and", insert
-- (d) establishing the properties of said address object by:
(i) placing a set of methods within said address object by utilizing a programming interface;
(ii) placing postal coding functionality within said address object by utilizing said programming interface;
(iii) placing address manipulation functionality within said address object by utilizing said programming interface;
(e) creating a human interface, for allowing data to be displayed to a system operator under direction from said object methods, and placing said human interface within said address object by utilizing said programming interface; --

Column 12,
Line 3, delete "(d)" and replace with -- (f) --.
Line 8, after "comprising:" insert
-- (a) establishing the properties of said address object by:
(i) placing a set of methods within said address object by utilizing a programming interface;
(ii) placing postal coding functionality within said address object by utilizing said programming interface;
(iii) placing address manipulation functionality within said address object by utilizing said programming interface;
(b) creating a human interface, for allowing data to be displayed to a system operator under direction from said object methods, and placing said human interface within said address object by utilizing said programming interface; --

UNITED STATES PATENT AND TRADEMARK OFFICE

CERTIFICATE OF CORRECTION

PATENT NO. : 6,253,219 B1
DATED : June 26, 2001
INVENTOR(S) : Gardner et al.

It is certified that error appears in the above-identified patent and that said Letters Patent is hereby corrected as shown below:

Column 12 (cont),
Line 9, delete "(a)" and replace with -- (c) --.
Line 10, delete "(b)" and replace with -- (d) --.
Line 12, delete "(c)" and replace with -- (e) --.
Line 14, delete "(d)" and replace with -- (f) --.

Signed and Sealed this

Second Day of July, 2002

*Attest:*

JAMES E. ROGAN

*Attesting Officer*

*Director of the United States Patent and Trademark Office*